US005577027A

United States Patent [19]

Cheng

[11] Patent Number: 5,577,027

[45] Date of Patent: Nov. 19, 1996

[54] APPARATUS AND METHOD FOR EFFECTIVELY ELIMINATING THE ECHO SIGNAL OF TRANSMITTING SIGNAL IN A MODEM

[75] Inventor: King Y. Cheng, Nevada City, Calif.

[73] Assignee: Intel Corporation, Santa Clara, Calif.

[21] Appl. No.: 423,083

[22] Filed: Apr. 18, 1995

[51] Int. Cl.[6] .......... H04B 3/23

[52] U.S. Cl. .......... 370/32.1; 379/411

[58] Field of Search .......... 370/24, 32, 32.1; 379/406, 410, 411; 364/723, 724.01

[56] References Cited

U.S. PATENT DOCUMENTS

| | | | |
|---|---|---|---|
| 5,353,279 | 10/1994 | Koyama | 379/410 |
| 5,414,766 | 5/1995 | Cannalire | 379/411 |
| 5,446,728 | 8/1995 | Lömark | 370/32.1 |

*Primary Examiner*—Benedict V. Safourek
*Attorney, Agent, or Firm*—Blakely, Sokoloff, Taylor & Zafman

[57] ABSTRACT

In a data transmission system that transmits a transmitting signal to an external network and receives a receiving signal plus an echo signal of the transmitting signal from the network, a method of eliminating the echo signal from the receiving signal includes the step of time interpolating samples of the transmitting signal at a sampling rate of the receiving signal before the transmitting signal is sent to the network. A replica signal of the echo signal is generated using the interpolated samples of the transmitting signal to cancel the echo signal from the receiving signal after the receiving and echo signals are also time interpolated at the sampling rate of the receiving signal. An apparatus for eliminating the echo signal from the receiving signal is also described.

18 Claims, 6 Drawing Sheets

APPARATUS AND METHOD FOR EFFECTIVELY ELIMINATING THE ECHO SIGNAL OF TRANSMITTING SIGNAL IN A MODEM

FIELD OF THE INVENTION

The present invention pertains to the field of data communications. More particularly, this invention relates to a modem ("modulator/demodulator") or other data transmission system that effectively eliminates the echo signal of a transmitting signal in a receiving signal of the modem by sampling the transmitting signal m the sampling rate of the receiving signal.

BACKGROUND OF THE INVENTION

When a computer system or other data terminal equipment ("DTE") is connected to a remote DTE or computer system via a public telephone network, a modem is typically used to connect the DTE or computer system to the telephone network. The function of the modem is to convert a digital signal into an analog signal that is suitable for transmission over the telephone network, and to convert an analog signal back into a digital signal.

FIG. 1 illustrates such a prior art communication system 10. As can be seen from FIG. 1, modem 11 is connected to a DTE 12 and an external network 15 and modem 13 is connected to a DTE 14 and network 15. Modem 11 includes a transmitter circuit 11*a*, a receiver circuit 11*b*, and a hybrid circuit 11*c*. Similarly, modem 13 includes a transmitter circuit 13*a*, a receiver circuit 13*b*, and a hybrid circuit 13*c*. When DTE 11 wants to send data to DTE 14, transmitter circuit 11*a* of modem 11 receives the transmitting data. Transmitter circuit 11*a* then processes and modulates the transmitting data into the transmitting signal suitable to be transmitted via network 15. The transmitting signal is then transmitted to modem 13 via hybrid circuit 11*c* and via network 15. When modem 13 receives the transmitting signal from modem 11 (now the receiving signal of modem 13), hybrid circuit 13*c* of modem 13 sends the receiving signal to receiver circuit 13*b*. Receiver circuit 13*b* then demodulates and processes the receiving signal into digital data which are then fed to DTE 14.

When DTE 12 receives data from DTE 14, DTE 14 sends the data to transmitter circuit 13*a* of modem 13 which are then processed and modulated to be sent to network 15 via hybrid circuit 13*c*. Network 15 then sends the modulated data to receiver circuit 11*b* of modem 11 via hybrid circuit 11*c*. Receiver circuit 11*b* then demodulates and processes the modulated data received from modem 13. The data are then applied to DTE 12.

Each of modems 11 and 13 is a full duplex modem. This means that each of hybrid circuits 11*c* and 13*c* can transmit and receive modulated data signal simultaneously.

When receiver circuit 11*b* of modem 11 receives a receiving signal from network 15 via hybrid circuit 11*c*, the receiving signal typically includes the modulated data transmitted from modem 13 and an echo signal of the transmitting signal of modem 11. The echo signal typically includes a near end echo signal and a far end echo signal. FIG. 1 shows the signal path of the near end echo signal and the far end echo signal.

As can be seen from FIG. 1, the near end echo signal is received in receiver circuit 11*b* through transmitter circuit 11*a* and hybrid circuit 11*c*. The far end echo signal is, however, the reflection of the transmitting signal of transmitter circuit 11*a* from network 15. As can be seen from FIG. 1, the far end echo signal is the transmitting signal of modem 11 that is transmitted to network 15 via hybrid circuit 11*c* and then echoed back from network 15 to receiver circuit 11*b* via hybrid circuit 11 *c*.

In order to cancel the near and far end echo signals from the receiving signal in receiver circuit 11*b*, a near end echo replica signal generation circuit and a far end echo replica signal generation circuit are typically provided in the modem. The near end echo replica signal generation circuit simulates the characteristics of the near end echo signal path and generates the replica signal of the near end echo signal. The far end echo replica signal generation circuit simulates the far end echo signal path and generates the replica signal of the far end echo signal. The replica signals are then used to cancel the echo signals from the receiving signal in the modem. FIG. 2 shows one prior art scheme of canceling the echo signals.

In order for replica signal generation circuits 24 and 26 to track variations along the echo signal paths, the output of echo canceller 27 of FIG. 2 is applied back to circuits 24 and 26 as feedback to adjust circuits 24 and 26 such that the replica signals can also track the variations of the echo signals. One disadvantage of this arrangement, however, is that the adjustment gain of circuits 24 and 26 by the output of echo canceller 27 is typically relatively low, thus causing the tracking of circuits 24 and 26 to be relatively slow. The relatively slow tracking is due to the fact that the output signal of echo canceller 27 is mainly the modulated data signal from the remote modem and the residual echo signals only constitute a relatively very small portion of the output signal of echo canceller 27. This typically causes the prior art echo canceling arrangement not to be able to track fast phase jitter occurred along the far end echo signal path. In addition, another disadvantage of the prior art arrangement is that due to the relatively extremely small adjustment gain, double precision arithmetic is typically required to process the tracking loop, thus increasing the overall processing complexity and time.

SUMMARY OF THE INVENTION

One of the features of the present invention is to sample and transmit a transmitting signal at the sampling rate of a receiving signal in a modem or other data transmission system in order to effectively eliminate an echo signal of the transmitting signal in the receiving signal.

Another feature of the present invention is to sample and transmit the transmitting signal at the sampling rate of the receiving signal such that a replica signal of the echo signal in the receiving signal can be quickly adjusted to track any variations of the echo signal.

In a data transmission system that transmits a transmitting signal to an external network and receives a receiving signal plus an echo signal of the transmitting signal from the network, a method of eliminating the echo signal from the receiving signal includes the step of time interpolating samples of the transmitting signal at a sampling rate of the receiving signal before the transmitting signal is sent to the network. A replica signal of the echo signal is generated using the interpolated samples of the transmitting signal to cancel the echo signal from the receive signal after the receiving and echo signals are also time interpolated at the same sampling rate of the receiving signal.

In a data transmission system that transmits a transmitting signal to an external network and receives a receiving signal plus an echo signal of the transmitting signal from the network, an apparatus for eliminating the echo signal from the receiving signal includes circuitry for time interpolating samples of the transmitting signal at a sampling rate of the receiving signal before the transmitting signal is sent to the network. Circuitry is provided for generating a replica signal of the echo signal using the interpolated samples of the transmitting signal to cancel the echo signal from the receive signal. Circuitry is also provided for time interpolating the receiving signal plus the echo signal at the sampling rate of the receiving signal before the echo signal is canceled by the replica signal in the data transmission system.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 3:
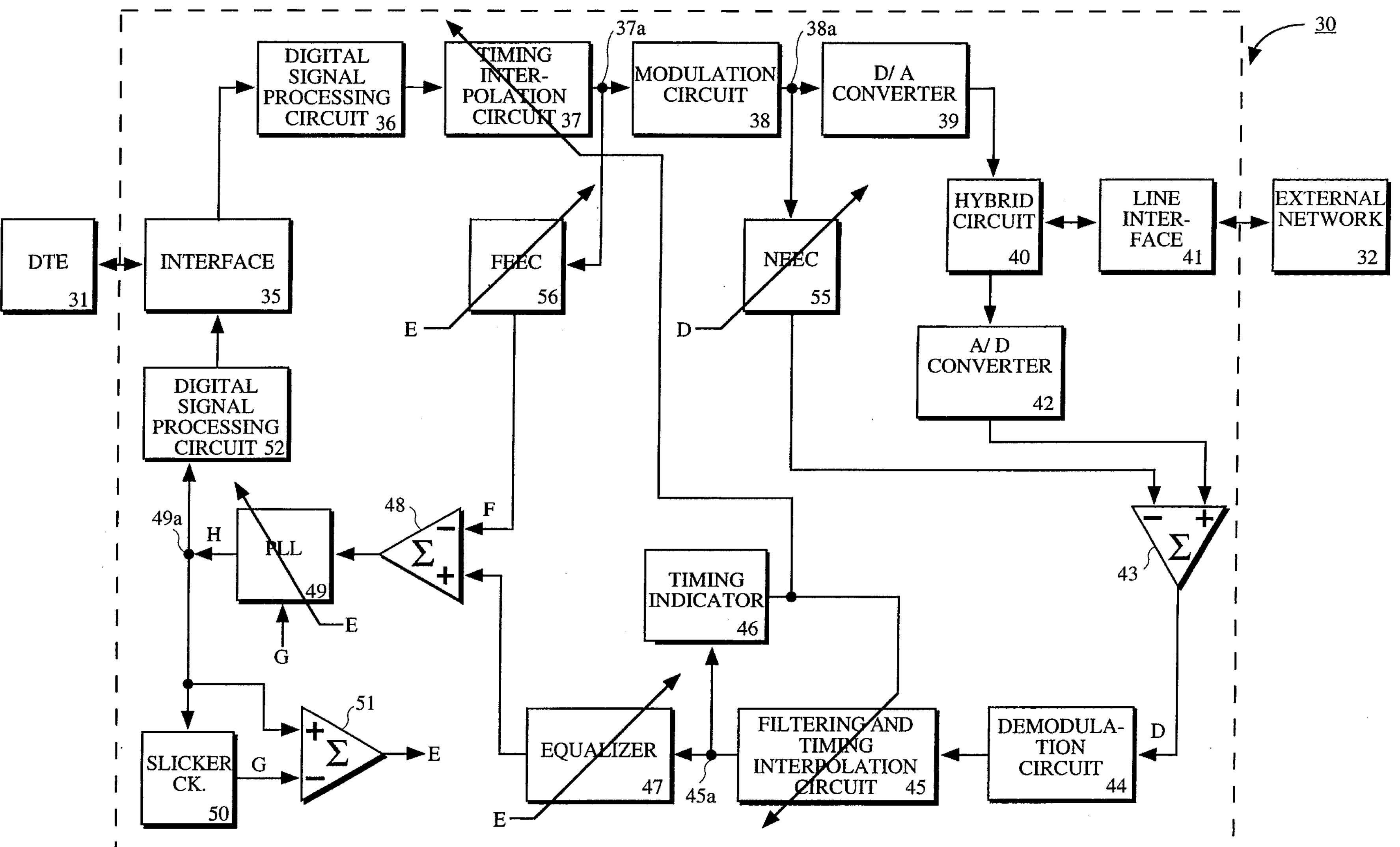
FIG. 3 is a block diagram of a modem that implements one embodiment of the present invention.

FIG. 3 illustrates in block diagram form a modem 30 that implements one embodiment of the present invention. As can be seen from FIG. 3, modem 30 is connected to a DTE ("Data Terminal Equipment") 31 and an external network 32.

As will be described in more detail below, modem 30 includes a timing interpolation circuit 37 for interpolating the transmitting signal of modem 30, the interpolation coefficients of circuit 37 are dynamically changed in accordance with the timing phase (i.e., sampling rate) of the received data signal such that the samples of the transmitting signal of modem 30 are interpolated to have the timing phase or sampling rate of the received data signal of modem 30. The interpolated transmitting signal is then applied to a far end echo signal simulation circuit ("FEEC") 56 to generate a far end echo replica signal. This allows the far end echo signal to be interpolated, when received in modem 30, to have the sampling rate of the received data signal before being canceled by the replica signal. As a result, the received data signal can be subtracted from the error which is the difference between the far end echo signal and the replica signal. The error is then used to adjust FEEC 56 such that the replica signal can track any variation occurred along the far end echo signal path quickly. This allows modem 30 to be less susceptible to echo signal path variation and the overall performance of modem 30 to be greatly enhanced. In addition, because the error is separated from the received data signal, the tracking gain is greatly increased. This causes modem 30 not to require any other means (e.g., double precision arithmetic) to additionally process the error.

Modem 30 is a full duplex intelligent modem. This means that modem 30 can simultaneously transmit and receive data signals to and from network 32. In addition, modem 30 can be any kind of other data transmission or communication controller. For example, modem 30 can be a LAN ("local area network") controller, a wireless communication controller, or any other data communication controller.

Network 32 is a public telephone network. Alternatively, network 32 can be any other type of data transmission network. For example, network 32 can be a LAN, a wide area network ("WAN"), an integrated service digital network ("ISDN"), or a fiber distribution data interface ("FDDI") network.

DTE 31 can be any kind of computer system or data processing system. For one embodiment, DTE 31 is a personal computer system. For alternative embodiments, DTE 31 can be any other computer system such as notebook, personal digital assistant, workstation, mainframe, or minicomputer. In addition, DTE 31 can be a data terminal or port connected to a computer system, or an electronic device that can interface with a modem.

Modem 30 includes an interface circuit 35 that interfaces with DTE 31. Modem 30 also includes a line interface 41 that interfaces modem 30 with external network 32 and that allows modem 30 to match characteristics of network 32. Line interface 41 is connected to a hybrid circuit 40 of modem 30. As described above, modem 30 is a full duplex modem. This means hybrid circuit 40 transmits and receives data signals to and from line interface 41 simultaneously. Each of interfaces 35 and 41 can be implemented by any known interfacing circuit of a modem. In addition, hybrid circuit 40 can also be any known hybrid circuit for a modem.

For one embodiment, all the circuitry of modem 30 except line interface 41 reside on a single semiconductor substrate. Alternatively, all the circuits of modem 30 except line interface 41 reside on two or more separately packaged semiconductor substrates. Furthermore, all the circuits of modem 30 can reside on a single semiconductor substrate.

Modem 30 also includes a digital signal processing circuit 36 connected between interface 35 and interpolation circuit 37, a modulation circuit 38 connected to interpolation circuit 37, and a D/A (digital-to-analog) converter 39 connected between modulation circuit 38 and hybrid circuit 40. Circuits 36 through 39 form the transmitting part of modem 30. Signal processing circuit 36 receives data to be transmitted to network 32 from DTE 31 via interface 35. Processing circuit 36 then processes the data to be transmitted. The processed data signal is then applied to interpolation circuit 37 for timing interpolation. The function of interpolation circuit 37 is to adjust the timing of the samples of the data signal to be transmitted. Interpolation circuit 37 and its function will be described in more detail below.

The interpolated data signal is then applied to modulation circuit 38 for modulation. The modulated signal is then applied to converter 39 for digital-to-analog conversion. The converted signal is then transmitted to external network 32 via hybrid circuit 40 and line interface 41 after passing through a smoothing filter (not shown in FIG. 3).

Signal processing circuit 36 performs known signal processing functions for the transmitting signal in modem 30 and thus can be implemented by any known signal processing circuit for a modem. In addition, modulation circuit 38 and converter 39 can also be implemented by any known modulation circuit and converter for a modem.

The receiving part of modem 30 includes an A/D (analog-to-digital) converter 42, a near end echo canceller 43, a demodulation circuit 44, an interpolation circuit 45, an equalizer 47, a far end echo signal simulation circuit 56, a far end echo signal canceller 48, a PLL (phase look loop) 49, and a digital signal processing circuit 52. In addition, the receiving part of modem 30 further includes a slicer circuit 50 and a subtraction circuit 51, which will be described in more detail below.

A/D converter 42 receives the receiving signal from external network 32 via interface 41 and hybrid circuit 40. The receiving signal includes the data signal transmitted from another modem (not shown in FIG. 3) to modem 30 via network 32, a far end echo signal, and a near end echo signal. After passing through a bandpass filter and a sample and hold circuit (both circuits are not shown in FIG. 3) clocked by a local clock signal of modem 30, the receiving signal is converted in converter 42. Converter 42 performs the analog-to-digital conversion to the receiving signal. Converter 42 can be any known A/D converter. The converted signal is then applied to near end echo canceller 43 to cancel the near end echo signal contained in the receiving signal.

In order to cancel the near end echo signal from the receiving signal, modem 30 also includes a near end echo signal simulation circuit ("NEEC") 55. NEEC 55 can be any known near end echo signal simulation circuit. NEEC 55 is connected to node 38*a* to receive the modulated transmitting signal. The function of NEEC 55 is to simulate or mimic the near end echo signal path to generate a replica signal of the near end echo signal. As is known, the near end echo signal is the transmitting signal of modem 30 that travels from D/A converter 39 to A/D converter 42 via hybrid circuit 40.

The replica signal generated by NEEC 55 is applied to near end echo canceller 43. Canceller 43 is essentially a subtraction circuit that can be implemented by any known digital subtraction circuit. Canceller 43 subtracts the replica signal from the receiving signal to eliminate the near end echo signal.

In addition, due to variations occurred along the near end echo signal path, the replica signal may not be identical to the near end echo signal. This causes the output D of canceller 43 to contain error of the near end echo signal cancellation. In order to eliminate the error and substantially completely cancel the near end echo signal from the receiving signal with the replica signal, the output D of canceller 43 is fed back to NEEC 55 to adjust the generation of the replica signal such that the replica signal tracks any variation along the near end echo signal path and mimics the near end echo signal. The adjustment of NEEC 55 in accordance with the D signal from canceller 43 is also known in the art.

The output D of canceller 43 is then applied to demodulation circuit 44. The function of demodulation circuit 44 is to demodulate the receiving signal. Demodulation circuit 44 can be any known demodulation circuit for a modem. The demodulated signal is then applied to filtering and timing interpolation circuit 45. The purpose of filtering and timing interpolation circuit 45 is to adjust the timing of the receiving signal and to filter out out-of-band signal and noise.

Because the receiving signal first passes through the sample and hold circuit clocked by the local clock signal of modem 30 before being converted and demodulated, the timing of the receiving signal is altered and needs to be recovered. This is due to the fact that the local clock rate of modem 30 may be slightly different from that of the remote modem that sends the data signal to modem 30 via network 32. When the receiving signal that contains the data signal transmitted from the remote modem passes through the sample and hold circuit clocked by the local clock signal of modem 30, the timing phase of the receiving signal may be altered and therefore needs to be recovered.

Interpolation circuit 45 recovers the timing phase of the receiving signal by interpolating the receiving signal. A timing indicator 46 is connected to the output of interpolation circuit 45 (i.e., node 45*a*). Timing indicator 46 then detects the timing of the interpolated signal from interpolation circuit 45 to adjust the coefficients of interpolation circuit 45. Interpolation circuit 45 employs a finite impulse response ("FIR") filter that can be selectively applied with a number of sets of filter coefficients, each set corresponding to a particular timing phrase. Co-pending application Ser. No. 08/389,254, filed Feb. 16, 1995, entitled MODEM WITH NOISE INDEPENDENT TIMING ADJUSTMENT, and assigned to the same assignee of the present patent application describes a timing interpolation circuit which employs a FIR filter and the coefficients of which are changed in accordance with the detected timing of the output of the filter. Co-pending application Ser. No. 08/389,254 also describes the circuit of the FIR filter and how the coefficients are being dynamically changed. The circuit of interpolation circuit 45 and timing indicator 46 and the operation of adjusting the coefficients of interpolation circuit 45 can substantially correspond to what is described in co-pending application Ser. No. 08/389,254 and therefore need not be described in more detail below.

In addition, as described above, modem 30 includes interpolation circuit 37 for interpolating the transmitting signal of modem 30. Interpolation circuit 37 can employ the same interpolation circuit as that described in co-pending application Ser. No. 08/389,254, except for the timing indicator. As can be seen from FIG. 3, interpolation circuit 37 does not include a timing indicator that is connected to node 37a for detecting the output of interpolation circuit 37 to adjust the coefficients of interpolation circuit 37. Instead and in accordance with one embodiment of the present invention, interpolation circuit 37 is connected to timing indicator 46. This causes the coefficients of interpolation circuit 37 to be adjusted in accordance with the detection of timing indicator 46. In other words, interpolation circuit 37 is controlled by timing indicator 46 to interpolate samples of the transmitting signal in accordance with the recovered timing phase of the receiving signal. This allows the far end echo signal in the receiving signal to have the same timing phase as that of the data signal transmitted from the remote modem. Thus, the far end signal can be interpolated by interpolation circuit 45 and then canceled by the far end echo replica signal generated from FEEC 56. As a result, the data signal can be separated from the receiving signal after far end echo signal cancellation such that an error signal E (i.e. residual) of the far end echo signal cancellation can be obtained from the receiving signal. The error signal E may also include other errors or distortions of the receiving signal and therefore can be referred to as transmission error.

The error signal E typically occurs when variations introduced to the far end echo signal path are not tracked by FEEC 56. The variations typically include power supply variations, temperature variations, process variations, and other environmental variations. Because the variations are not tracked by FEEC 56, the replica signal cannot be identical to the far end echo signal contained in the receiving signal. When the replica signal is used to cancel the far end echo signal, the error signal E is generated.

Figure 4:
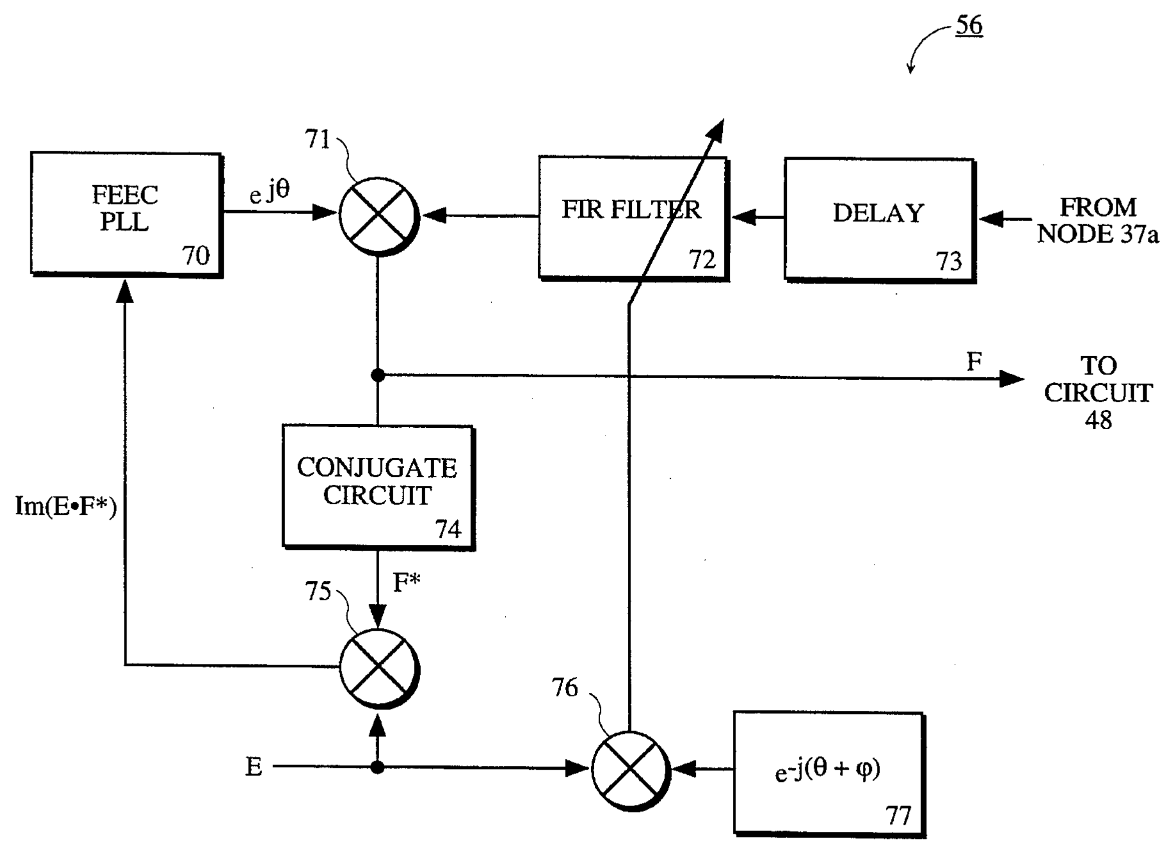
FIG. 4 is a block diagram of a far end echo replica signal generation circuit of the modem of FIG. 3.

The error signal E is fed back to FEEC 56 to adjust FEEC 56. As can be seen from FIG. 3, FEEC 56 is connected to node 37*a* to receive the transmitting signal that has been interpolated to have the timing phase of the receiving signal. FEEC 56 then simulates the far end echo signal path to generate the far end echo replica signal. The replica signal is then used to subtract the far end echo signal from the receiving signal (after interpolation in circuit 45). The circuit of FEEC 56 is shown in FIG. 4, which will be described in more detail.

As described above and in accordance with one embodiment of the present invention, because the transmitting signal is interpolated at the timing phase of the receiving signal, the far end echo signal is allowed to be canceled after the timing phase of the receiving signal is recovered. This also allows the error signal E not to contain the data signal transmitted from the remote modem, thus increasing the tracking gain or adjustment gain of FEEC 56. This in turn increases the tracking speed of FEEC 56 with respect to the variations in the far end echo signal without requiring additional processing of the error signal E. This in turn causes modem 30 to be less susceptible to echo signal path variations and enhances the overall performance of modem 30. The process of canceling the far end echo signal and the process of obtaining the error signal E will be described in more detail below.

The output of interpolation circuit 45 is applied to an equalizer 47 in addition to timing indicator 46. As described above, the function of timing indicator 46 is to adjust adjusting coefficients of interpolation circuits 37 and 45 such that the output signals at nodes 37*a* and 45*a* are interpolated to have the timing phase or sampling rate of the data signal received from the remote modem via network 32. Timing indicator 46 can be any known timing indicator circuit. The function and circuit configuration of equalizer 47 will be described in more detail below, also in conjunction with FIG. 5.

The interpolated signal from interpolation circuit 45 is then applied to digital signal processing circuit 52 via equalizer 47, a far end echo canceller 8, and a PLL 49. In addition, the output of PLL 49 is applied to a slicer circuit 50 and subtraction circuit 51 for generating the error signal E. Circuits 47–51 and their functions will be described in more detail below.

Processing circuit 52 processes the signal received from PLL 49 into digital data and then sends the data to DTE 31 via interface 35. Processing circuit 52 performs known digital signal processing functions and thus can be implemented by any known digital signal processing circuit for a modem.

Canceller 48 is connected to FEEC 56 and equalizer 47 for canceling the far end echo signal from the receiving signal using the replica signal generated by FEEC 56. Canceller 48 can by any known digital subtraction circuit. As described above, FEEC 56 simulates the far end echo signal path to generate the replica signal. However, FEEC 56 itself does not and cannot predict variations occurred along the far end echo signal path. The tracking of the variations along the far end echo signal path is controlled by the error signal E. The generation of the error signal E is described below.

After passing through canceller 48 and PLL 49, the receiving signal (i.e., H signal) now contains the data signal and the error signal. The receiving signal is then applied to subtraction circuit 51. In addition, the receiving signal is also applied to slicer circuit 50 which is then connected to subtraction circuit 51. The function of slicer circuit 50 is to correct vector distortion of the receiving signal caused by noise or channel distortion. Slicer circuit 50 can also be referred to as decision circuit or vector determination circuit. Slicer circuit 50 can be any known slicer circuit.

Slicer circuit 50 adjusts the vector of the receiving signal received from PLL 49 by looking for the closest predetermined vector of the incoming vector. After the vector of the receiving signal is adjusted in slicer circuit 50, the adjusted signal (i.e., G signal) is applied to subtraction circuit 51 to generate the error signal E. The E error signal is then applied to FEEC 56.

FIG. 4 shows the circuit of FEEC 56. In addition, FIG. 4 also shows the arrangement of adjusting the circuit of FEEC 56 using the error signal E.

As can be seen from FIG. 4, FEEC 56 includes a PLL 70, phase rotators (i.e., multipliers) 71 and 75–76, a conjugate circuit 74, an FIR filter 72, and a delay circuit 73. Delay circuit 73 can be any known delay circuit and simulates the delay introduced to the far end echo signal path of modem 30. FIR filter 72 can have the same circuit structure of interpolation circuit 37 or 45, or equalizer 47. In addition, other known digital filter circuits can also be employed to form FIR filter 72. The filtering coefficients of FIR filter 72 are adjusted by the output of phase rotator 76. The function of filter 72 is to interpolate the timing phase of the delayed transmitting signal in accordance with the output of phase rotator 76. Phase rotator 76 receives the error signal E and the output of circuit 77. Circuit 77 generates the exponent of the negative of FEEC phase correction from PLL 70 plus the phase correction at PLL 49. The output of phase rotator 76 is then used to adjust the application of the filter coefficients of FIR filter 72.

The function of PLL 70 is to correct phase of the replica signal from FIR filter 72. The phase error is generated at the output of phase rotator 75. The phase error (i.e., the imagining part of ($E \cdot F^*$)) is then applied to PLL 70 to adjust the phase correction of PLL 70. PLL 70 can have the same circuit configuration as PLL 49 of FIG. 3. In addition, PLL 70 can be implemented by other known digital PLL circuit.

Referring back to FIG. 3, equalizer 47 is used to correct amplitude distortion of the receiving signal. As described above, the receiving signal at node 45*a* contains the transmitted data signal from the remote modem and the far end echo signal. Equalizer 47 also corrects phase distortion (i.e., group delay) of the receiving signal. These distortions are introduced to the receiving signal at network 32. Equalizer 47 is used to correct the group delay by making linear the phase response for every frequency component. As is known, every frequency has a phase response. If the transmission is good, the phase response should be linear.

Figure 1:
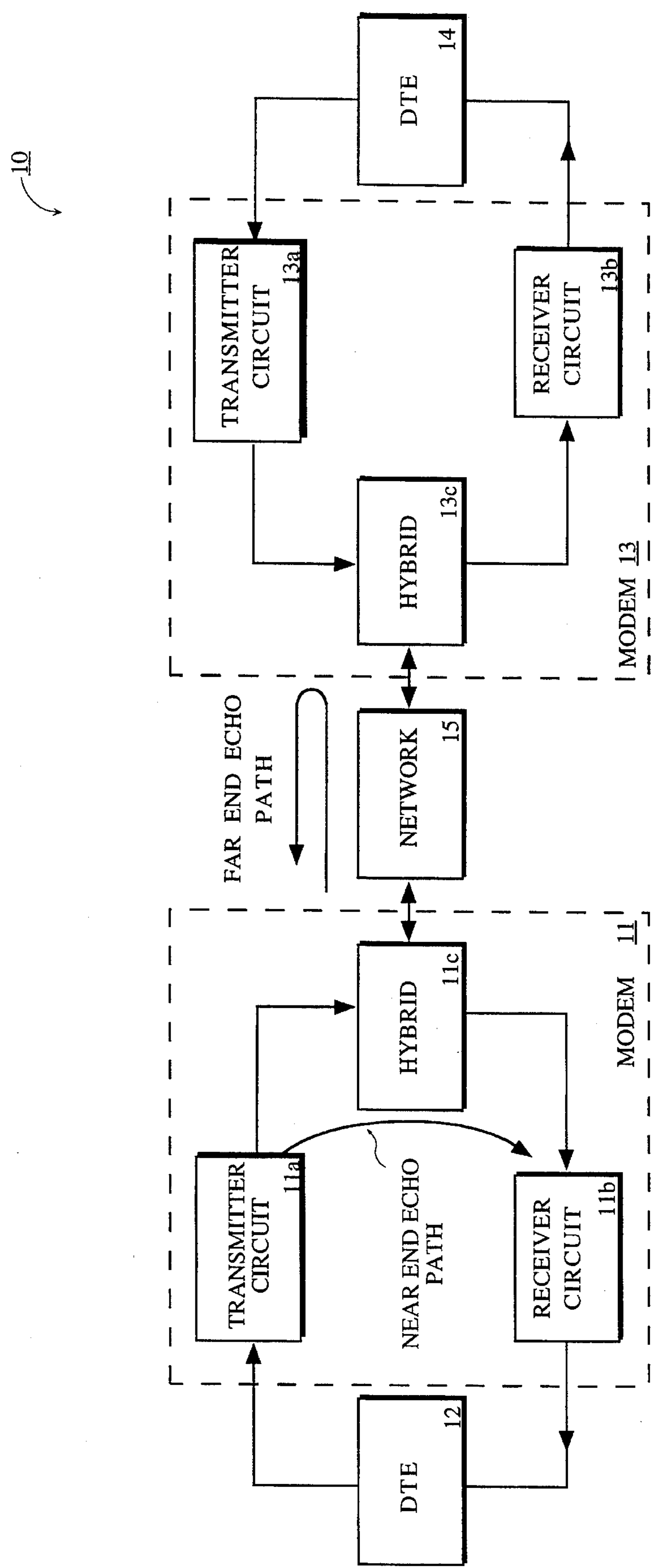
FIG. 1 is a block diagram of a modem communication system that shows the near end echo signal path and the far end echo signal path for a modem.
Figure 2:
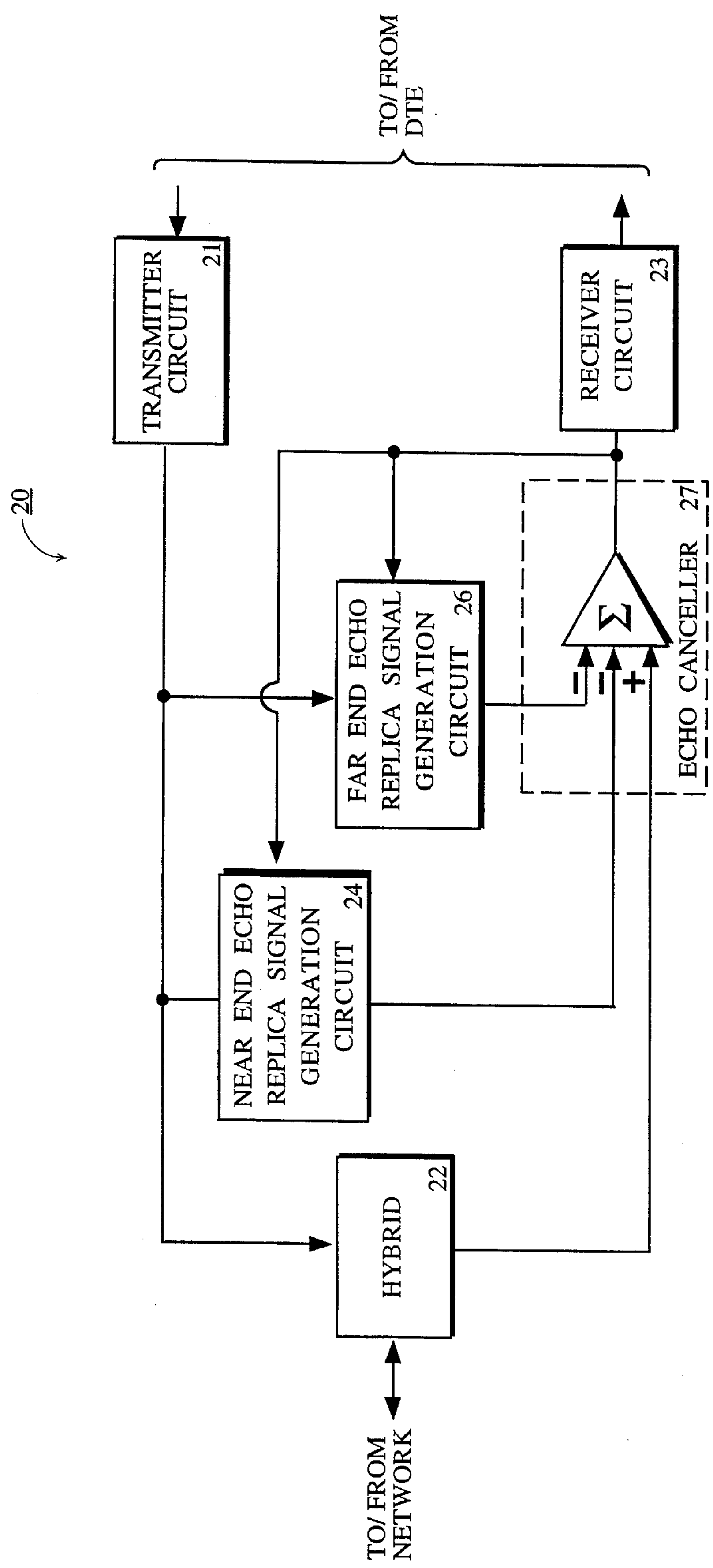
FIG. 2 is a block diagram of a modem that implements a prior art scheme for canceling the far end and near end echo signals.
Figure 5:
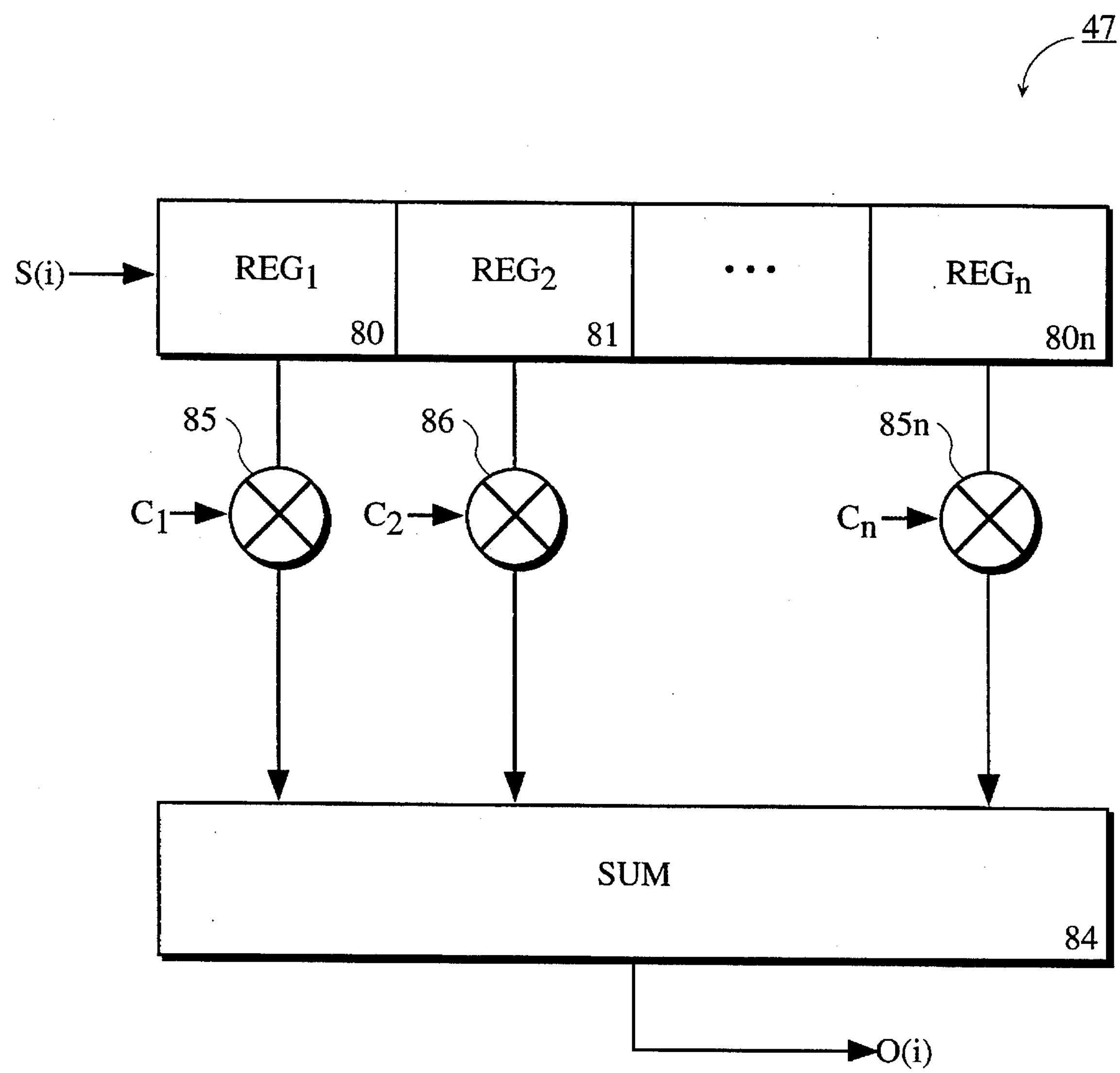
FIG. 5 is a block diagram of an equalizer of the modem of FIG. 3.

Equalizer 47 employs a finite impulse response ("FIR") filter circuit that can be selectively applied with a number of sets of coefficients. The selection and application of the coefficients to equalizer 47 is also controlled by the error signal E. This allows equalizer 47 to track variations along the signal path of the data signal transmitted to modem 30 from the remote modem via network 32. As can be seen from FIG. 1, the signal path of the data signal from the remote modem forms part of the signal path of the far end echo signal of modem 30. Therefore, any variations along the far end echo signal path are also introduced to the data signal transmitted from the remote modem to modem 30. By applying the error signal E to equalizer 47, equalizer 47 can track the variations occurred along the signal path of the data signal to adjust its correction of the amplitude and group delay distortions. FIG. 5 shows how the error signal E is used to adjust equalizer 47.

As can be seen from FIG. 5, equalizer 47 includes a number of registers 80–80$n$ and a number of multipliers 85–85$n$. Each multiplier is applied with one of a set of coefficients $C_1$ through $C_n$. The coefficients are determined in accordance with the following formula.

$$C_i^{(m+1)}=C_i^{(m)}+K\cdot E\cdot e^{-j\phi}\cdot S^*(i)$$

wherein i=1,2, . . . , or n;

$C_i^{(m+1)}$ represents the new and adjusted coefficient of $C_i^m$ and $C_i^m$ represents the currently applied coefficient;

K represents a constant;

E is the error signal from the output of circuit 51;

$\phi$ represents the phase error output of PLL 49;

S*(i) represents the conjugate of the input signal S(i) to equalizer 47.

Figure 6:
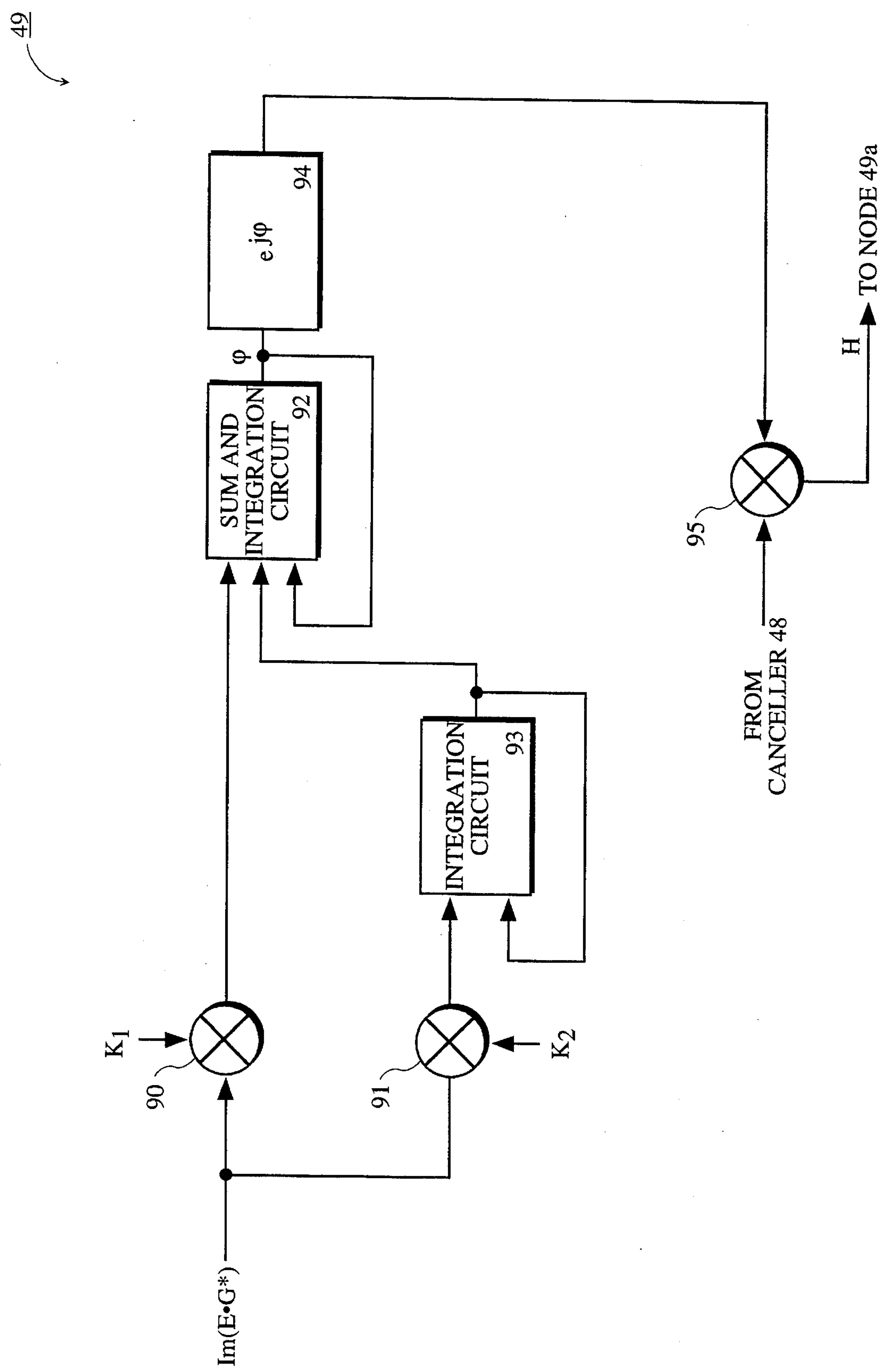
FIG. 6 is a block diagram of a PLL (phase lock loop) of the modem of FIG. 3.

Referring back to FIG. 3, PLL 49 is used to correct carrier phase offset of the receiving signal. PLL 49 does this by changing the carrier phase and frequency offset (i.e., error) of the receiving signal. For example, when the vector of the input signal to PLL 49 should be 90° but in fact not, PLL 49 corrects this by rotating the vector to the right phase. PLL 49 is also adjusted by the error signal E. The error signal E causes the PLL 49 to track any variations along the signal path of the carrier signal of the receiving signal. Because the signal path of the carder signal of the receiving signal forms part of the signal path of the far end echo signal of modem 30, the error signal E can be used to control PLL 49 to track the variations along the signal path of the carrier signal of the receiving signal. PLL 49 can be implemented by any known PLL circuit. FIG. 6 shows how the error signal E is used to adjust PLL 49, which will be described below.

As seen in FIG. 6, $K_1$ and $K_2$ are two fixed gains for PLL 49 and integration circuit 93 is used for integrating the output of multiplier 91 and integration circuit 92 is used to sum and integrate the output of multiplier 90 and circuit 93. The output of circuit 92 indicates the phase error of the carrier. The output $\phi$ is then applied to circuit 94 for calculating the exponent of the phase error $\phi$. The output of circuit 94 is then sent to phase rotator 95 for rotating the phase of the receiving signal from canceller 48. Phase rotator 95 is implemented by a multiplier. The input of multipliers 90 and 91 of PLL 49 is Im (E·G*) which is the imaginary part of the multiplication of E and G*, wherein G* is the conjugate of the G signal from slicer circuit 50.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. In a data transmission system that transmits a transmitting signal to an external network and receives a receiving signal plus an echo signal of the transmitting signal from the network, a method of eliminating the echo signal from the receiving signal, comprising the steps of:

(A) sampling the receiving signal;

(B) time interpolating samples of the transmitting signal at a sampling rate of the receiving signal before the time interpolated transmitting signal is sent to the network; and (C) generating a replica signal of the echo signal using the interpolated samples of the transmitting signal to cancel the echo signal from the receiving signal after the receiving and echo signals are also time interpolated at the sampling rate of the receiving signal.

2. The method of claim 1, further comprising the step of time interpolating the receiving signal plus the echo signal at the sampling rate of the receiving signal before the echo signal is canceled by the replica signal in the data transmission system.

3. The method of claim 2, further comprising the step of generating an error signal to adjust the replica signal to mimic the echo signal after the step of time interpolating the echo signal with the receiving signal, wherein the error signal is resulted from the subtraction of the replica signal and the echo signal.

4. The method of claim 3, wherein the step of adjusting the replica signal further comprises the steps of (a) subtracting the replica signal from the receiving signal plus the echo signal to obtain the receiving signal plus the error signal;

(b) subtracting the receiving signal from the receiving signal plus the error signal to obtain the error signal;

(c) adjusting the replica signal in accordance with the error signal, wherein the error signal only contains the subtraction of the replica and echo signals such that adjustment gain of the replica signal is substantially high.

5. In a data transmission system that transmits a transmitting signal to an external network and receives a receiving signal plus an echo signal of the transmitting signal from the network, a method of eliminating the echo signal from the receiving signal, comprising the steps of:

(A) sampling the receiving signal;

(B) time interpolating samples of the transmitting signal at a sampling rate of the receiving signal before the time interpolated transmitting signal is sent to the network;

(C) time interpolating samples of the echo and receiving signals at the sampling rate of the receiving signal; and (D) generating a replica signal of the echo signal using the interpolated samples of the transmitting signal to cancel the echo signal from the receiving signal;

(E) adjusting the replica signal to mimic the echo signal using an error signal that only contains the subtraction of the replica and echo signals after the step (B) such that adjustment gain of the replica signal is substantially high, wherein the error signal causes the replica signal to be adjusted to mimic the echo signal.

6. The method of claim 5, wherein the step of adjusting the replica signal further comprises the steps of (a) subtracting the replica signal from the receiving signal plus the echo signal to obtain the receiving signal plus the error signal;

(b) subtracting the receiving signal from the receiving signal plus the error signal to obtain the error signal;

(c) adjusting the replica signal in accordance with the error signal.

7. The method of claim 6, further comprising the steps of (I) correcting amplitude and phase distortion of the receiving and echo signals using an equalizer after the step (B);

(II) adjusting correction coefficients of the equalizer using the error signal such that the step (I) is performed independent of power supply variation, temperature variation, and other environmental variation of the receiving signal.

8. The method of claim 7, further comprising the steps of (i) correcting carrier phase offset of the receiving and echo signals using a phase lock loop (PLL) after the step (B);

(ii) adjusting of the PLL using the error signal such that the step (i) is performed independent of power supply variation, temperature variation, and other environmental variation of the receiving signal.

9. In a data transmission system that transmits a transmitting signal to an external network and receives a receiving signal plus an echo signal of the transmitting signal from the network, an apparatus for eliminating the echo signal from the receiving signal, comprising:

(A) means for sampling the receiving signal;

(B) means for time interpolating samples of the transmitting signal at a sampling rate of the receiving signal before the time interpolated transmitting signal is sent to the network;

(C) means for generating a replica signal of the echo signal using the interpolated samples of the transmitting signal to cancel the echo signal from the receiving signal; and (D) means for time interpolating the receiving signal plus the echo signal at the sampling rate of the receiving signal before the echo signal is canceled by the replica signal in the data transmission system.

10. The apparatus of claim 9, further comprising means for adjusting the replica signal to mimic the echo signal in accordance with an error signal resulted from the subtraction of the replica signal and the echo signal after the echo signal plus the receiving signal is time interpolated.

11. The apparatus of claim 10, wherein the means of adjusting the replica signal further comprises (a) means for subtracting the replica signal from the receiving signal plus the echo signal to obtain the receiving signal plus the error signal;

(b) means for subtracting the receiving signal from the receiving signal plus the error signal to obtain the error signal;

(c) means for adjusting the replica signal in accordance with the error signal, wherein the error signal only contains the subtraction of the replica and echo signals such that adjustment gain of the replica signal is substantially high.

12. The apparatus of claim 11, further comprising (I) an equalizer for correcting amplitude and phase distortion of the receiving and echo signals after the receiving and echo signals are time interpolated;

(II) means for adjusting correction coefficients of the equalizer using the error signal such that the equalizer is independent of power supply variation, temperature variation, and other environmental variation;

(III) a phase lock loop (PLL) for correcting carrier phase offset of the receiving and echo signals after the receiving and echo signals are time interpolated;

(IV) means for adjusting the PLL using the error signal such that the PLL is independent of power supply variation, temperature variation, and other environmental variation.

13. The apparatus of claim 9, wherein the data transmission system is a modem.

14. In a data transmission system that transmits a transmitting signal to an external network and receives a receiving signal plus an echo signal of the transmitting signal from the network, an apparatus for eliminating the echo signal from the receiving signal, comprising:

(A) a circuit for sampling the receiving signal;

(B) a first interpolator coupled to the circuit and also coupled to receive the transmitting signal for time interpolating samples of the transmitting signal at a sampling rate of the receiving signal before the time interpolated transmitting signal is sent to the network;

(C) a echo replica signal generation circuit coupled to the first interpolator for generating a replica signal of the echo signal using the interpolated samples of the transmitting signal to cancel the echo signal from the receiving signal; and (D) a second interpolator coupled to the network for time interpolating the receiving signal plus the echo signal at the sampling rate of the receiving signal before the echo signal is canceled by the replica signal in the data transmission system.

15. The apparatus of claim 14, further comprising circuitry coupled to the second interpolator and the echo replica signal generation circuit for obtaining an error signal from the subtraction of the replica and echo signals after the echo signal plus the receiving signal is time interpolated by the second interpolator to adjust the echo replica signal generation circuit such that the replica signal mimics the echo signal.

16. The apparatus of claim 15, wherein the circuitry for obtaining the error signal further comprises (a) a first subtraction circuit coupled to the second interpolator and the echo replica signal generation circuit for subtracting the replica signal from the receiving signal plus the echo signal to obtain the receiving signal plus the error signal;

(b) a second subtraction circuit coupled to the first subtraction circuit and to the first subtraction circuit via a slicer circuit for subtracting the receiving signal from the receiving signal plus the error signal to obtain the error signal;

(c) circuitry coupled to the second subtraction circuit and the echo replica signal generation circuit for applying the error signal to the echo replica signal generation circuit to adjust the replica signal in accordance with the error signal such that adjustment gain of the replica signal is substantially high.

17. The apparatus of claim 16, further comprising (I) an equalizer coupled to the second interpolator for correcting amplitude and phase distortion of the receiving and echo signals after the receiving and echo signals are time interpolated;

(II) circuitry coupled to the equalizer and the circuitry for applying the error signal for adjusting correction coefficients of the equalizer in accordance with the error signal;

(III) a phase lock loop (PLL) coupled to the equalizer for correcting carrier phase offset of the receiving and echo signals after the receiving and echo signals are time interpolated;

(IV) circuitry coupled to the PLL and the circuitry for applying the error signal for adjusting the PLL using the error signal such that the PLL is independent of power supply variation, temperature variation, and other environmental variation.

18. The apparatus of claim 14, wherein the data transmission system is a modem used in a computer system.

* * * * *

UNITED STATES PATENT AND TRADEMARK OFFICE
CERTIFICATE OF CORRECTION

PATENT NO. : 5,577,027

DATED : November 19, 1996

INVENTOR(S) : King Y. Cheng

It is certified that error appears in the above-identified patent and that said Letters Patent is hereby corrected as shown below:

In column 1 at line 14 delete "m" and insert --at--

In column 7 at line 38 delete "canceller 8," and insert --canceller 48,--

In column 9 at line 27 delete "carder" and insert --carrier--

Signed and Sealed this

Fourth Day of March, 1997

*Attest:*

BRUCE LEHMAN

*Attesting Officer*

*Commissioner of Patents and Trademarks*